United States Patent [19]

Moore

[11] Patent Number: 4,846,509
[45] Date of Patent: Jul. 11, 1989

[54] FLEXIBLE JOINT MEANS

[75] Inventor: Alan F. Moore, Burbage, England

[73] Assignee: Dunlop Limited a British Company, United Kingdom

[21] Appl. No.: 53,062

[22] Filed: May 22, 1987

[30] Foreign Application Priority Data

May 27, 1986 [GB] United Kingdom ............... 8612758
Jan. 29, 1987 [GB] United Kingdom ............... 8701997

[51] Int. Cl.$^4$ ........................................... F16L 27/04
[52] U.S. Cl. ................................... 285/225; 285/229; 285/237; 285/900
[58] Field of Search ............... 285/223, 225, 226, 229, 285/237, 900, 228

[56] References Cited

U.S. PATENT DOCUMENTS

| | | | |
|---|---|---|---|
| 1,220,270 | 3/1917 | Phillips, Jr. .......................... | 285/225 |
| 1,923,124 | 8/1933 | Stanley .................................. | 285/225 |
| 3,236,544 | 2/1966 | Brown ................................... | 285/223 X |
| 3,680,895 | 8/1972 | Herbert et al. ...................... | 285/223 X |
| 3,853,337 | 12/1974 | Herbert et al. . | |
| 4,068,864 | 1/1978 | Herbert et al. ...................... | 285/49 |
| 4,121,861 | 10/1978 | Gorndt . | |
| 4,183,556 | 1/1980 | Schwemmer . | |
| 4,273,363 | 6/1981 | Angel ................................... | 285/49 X |
| 4,295,671 | 10/1981 | Clebant .............................. | 285/223 |

FOREIGN PATENT DOCUMENTS

| | | |
|---|---|---|
| 0044231 | 1/1982 | European Pat. Off. . |
| 2353914 | 5/1975 | Fed. Rep. of Germany ...... 285/223 |
| 737253 | 12/1932 | France ................................ 285/225 |
| 936754 | 9/1963 | United Kingdom . |
| 1133965 | 11/1968 | United Kingdom . |
| 1514431 | 6/1978 | United Kingdom . |
| 1591483 | 6/1981 | United Kingdom . |
| 2121905 | 1/1984 | United Kingdom . |
| 2159224 | 11/1985 | United Kingdom . |
| 84/02565 | 7/1984 | World Int. Prop. O. . |

*Primary Examiner*—Randolph A. Reese
*Assistant Examiner*—Anthony Knight
*Attorney, Agent, or Firm*—Stevens, Davis, Miller & Mosher

[57] ABSTRACT

In a flexible joint having a through-bore for the flow of fluid and comprising a pair of annular rigid members relatively rotatable about the longitudinal axis of the flexible joint, an annular elastomeric bearing is interposed between the relatively rotatable annular rigid members to flexibly interconnect the members and transmit load therebetween, and a normally sealed annular chamber is provided between the relatively rotatable annular rigid members and arranged to extend over an otherwise exposed surface of the bearing. Preferably the annular chamber is defined in part by a flexible diaphragm; the flexible diaphragm or the manner in which it is located permits relative rotational movement of the rigid members.

8 Claims, 5 Drawing Sheets

FLEXIBLE JOINT MEANS

This invention concerns improvements in or relating to flexible joint means and in particular, though not exclusively, to flexible joint means for a fluid conduit.

In accordance with the present invention there is provided a flexible joint means having a through-bore for the flow of fluid, said joint means comprising a pair of annular rigid members relatively rotatable about the longitudinal axis of the flexible joint means, annular elastomeric bearing means interposed between said relatively rotatable annular rigid members to flexibly interconnect said members and transmit load therebetween, and a normally sealed annular chamber between said relatively rotatable annular rigid members and arranged to extend over an otherwise exposed surface of the bearing means.

Preferably said sealed annular chamber is positioned to protect the bearing means from contact by fluid flowing through the bore of the joint means during use thereof.

The annular chamber may be defined in part by a flexible diaphragm which extends between the annular rigid members. The annular chamber may be defined wholly by surfaces of the bearing means and diaphragm or additionally may be defined in part by a surface of at least one of the annular rigid members.

The flexible diaphragm may be constructed from, for example, a metallic material such as stainless steel or a flexible polymer, typically a reinforced polymeric material, the material chosen being one which is suitably resistant to degradation by fluid to which it is to be exposed during use of the joint means.

The flexible diaphragm may be of a material and/or shape selected to enable it to accommodate relative rotation of the annular rigid members. Alternatively or additionally a seal assembly such as an annular face seal assembly may be provided between the diaphragm and one of the rigid members so that the diaphragm may rotate relative to said one of the rigid members in a manner in which leakage of fluid therebetween is prevented. The seal assembly may also be of a kind which permits relative radial movement between the diaphragm and said one of the rigid members, in this case a suitable radial clearance being provided between a periphery of the diaphragm and a confronting surface of said one of the rigid members.

As an alternative to the provision of a flexible diaphragm formed from a substantially unitary piece of material, a multi-part diaphragm assembly incorporating sliding members, such as relatively rotatable telescopic rings, may be employed.

Commonly the design of the joint means will be such that during flexing the joint means tends to pivot about one or more transverse axes the position of which is known relative to the length of the joint means as considered in the normal direction of flow of fluid through the joint means. In joint means of this type it is preferred that the flexible diaphragm be positioned along the length of the joint means at or close to the location of the pivot point. Deflection and thus stress on the diaphragm is thereby kept to a minimum during relative conical movement of the annular rigid members.

The annular chamber may be filled with a neutral fluid, such as water containing a corrosion inhibitor or a silicon oil, which does not degrade the elastomeric material of the bearing means. Such fluid also should be one which does not degrade the material of the diaphragm or any surfaces of the rigid members with which it comes into contact. The fluid also should be neutral to the extent of not reacting adversely when subjected to high temperatures, rapid pressure change or other extremes of environmental conditions.

Preferably the joint means is constructed such that the fluid pressure in the annular chamber equals or substantially equals that in the through-bore of the joint means.

In constructions in which the annular chamber is defined in part by a flexible diaphragm the flexibility of the diaphragm normally will be sufficient to ensure that it is not subject to any potentially damaging pressure differentials. However, as an alternative or in addition to the flexibility of a flexible diaphragm the joint means maybe provided with pressure balancing means for equalization of pressure in the annular chamber and the through-bore. The balancing means may, for example, comprise a passage within which a piston member may slide to permit variation of the volume of and thus pressure in the annular chamber.

Avoidance of a significant pressure differential is particularly advantageous in constructions in which a diaphragm is sealingly and slidingly located relative to an inner or outer rigid member insofar as there is thereby minimized the demands placed on the seal and the risk of any neutral fluid migrating from the annular chamber or any potentially damaging fluids migrating into the annular chamber.

Where an annular face seal assembly is provided between a diaphragm and one of the rigid members preferably said annular face seal assembly comprises an annular face seal and an annular actuation ring for location relative to one of the diaphragm and said one of the rigid members, said face seal having a first face which is a transverse radial sealing face and a second face against which the annular actuation ring may bear, said actuation ring comprising an element of resiliently deformable polymeric material whereby when in a deformed condition the actuation ring may cause the sealing face of the face seal to bear in sealing contact against the other of said diaphragm and said one of the rigid members.

Preferably said one of the rigid members is a housing member for location of the face seal assembly, the diaphragm being provided with an annular transverse radial sealing surface against which the first, annular transverse radial sealing face of a face seal assembly may bear. The annular actuation ring provided between said second face of the actuation ring and said housing member is maintained in a deformed condition whereby the resiliency of the deformed material results in the actuation ring causing the sealing surface of the face seal to bear in sealing contact against the sealing surface of the diaphragm.

It is envisaged that in general the annular actuation ring shall be an annularly continuous member though in some applications it may be desired to provide a series of members, optionally circumferentially spaced, and arranged to serve as an annular actuation ring.

A flexible joint in accordance with the present invention and provided with an annular face seal assembly may be constructed by locating the face seal assembly relative to one of the relatively rotatable members, namely said diaphragm and one of the rigid members, while said members are axially spaced, and then moving said members axially towards one another to bring the sealing face of the annular face seal into contact with the radial sealing surface of said second of the rotatable members and to deform the resilient polymeric material of the actuation ring whereby said ring resiliently supports the face seal and causes the sealing face thereof to be maintained in sealing contact against the sealing surface of the second rotatable member in the resulting assembly.

Preferably an auxiliary seal such as an 'O' ring type seal is provided to act against an axially extending side surface of the face seal to prevent fluid contained by the face seal coming into contact with the actuation ring. In particular, to assist in achieving a sealed assembly in which the contact force between the sealing face of the face seal and the sealing surface of a relatively rotatable member is substantially independent of the pressure of fluid contained by the sealed assembly it is preferred that the auxiliary seal be of a kind which substantially isolates the actuating ring from the pressure of fluid contained by the seal assembly.

It is further preferred that the actuating ring be formed from a resilient deformable material having a hardness in the range 80 to 90 Shore A. In contrast the face seal typically will have a hardness of at least 50 Shore D.

Embodiments of the invention will now be described by way of example only, with reference to the accompanying diagrammatic drawings in which.

Figure 1:
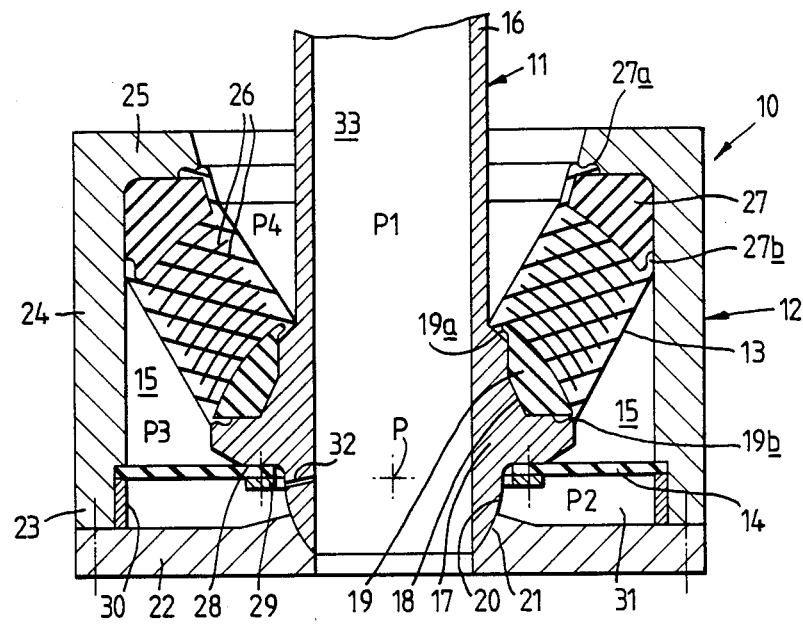
FIG. 1 is a longitudinal sectional view of a flexible joint means in accordance with the present invention.

The flexible joint means 10 of FIG. 1 comprises an annular inner rigid member 11, an annular outer rigid member 12, a load bearing and transmitting annular elastomeric bearing 13 and an annular diaphragm 14 which extends between the rigid members and defines a sealed chamber 15 adjacent a surface of the elastomeric bearing.

Figure 2A:
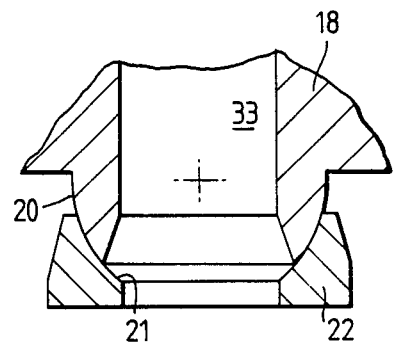
FIGS. 2a and 2b are detailed views of part of FIG. 1 showing the spherical metal bearing when under zero deflection and 15 degrees deflection respectively.
Figure 2B:
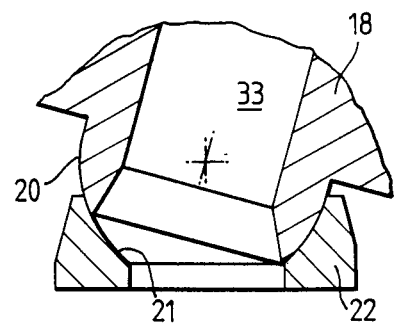

The inner rigid member 11 has a tubular portion 16 an upper end of which, as viewed in FIG. 1, is attachable to a conduit (not shown) and a lower end of which has an annularly thickened bearing support portion 17 formed integral therewith. The support portion 17 has an annular recess 18 for supporting an inner ring 19 of the elastomeric bearing and a part-spherical shape end surface 20 for sliding contact with a complementary shaped bearing surface 21 of the outer rigid member. FIGS. 2a and 2b show the spherical bearing arrangement in more detail.

The outer rigid member 12 comprises an annular end flange portion 22 the radially inner edge region of which defines the aforementioned bearing surface 21. The outer edge region of the end flange portion is secured by bolts to one end 23 of a cylindrical outer housing 24. The other end of the housing 24 has an integral radially inwardly extending flange 25 the inner diameter of which is sufficiently greater than the portion 16 of the inner member 11 to ensure that the flange 25 does not undesirably restrict relative movement of the inner and outer members 11,12.

The elastomeric bearing 13 is of a generally frusto-conical shape and comprises natural rubber of a hardness in the range 60 to 80 Shore A having embedded therein a plurality of annular part-spherical shaped metal reinforcing layers 26 the respective centres of curvature of which are substantially coincident with the centre of curvature, being the pivot centre P, of the bearing surface 20,21. The elastomeric bearing additionally comprises the aforementioned inner ring 19 and an outer ring 27, each of said rings being bonded to the intervening natural rubber. The outer ring 27 locates between the housing 24 and flange 25 and the unstressed length of the elastomeric bearing is greater than the length shown in FIG. 1; during assembly the elastomeric bearing is loaded in compression by urging the flange portion 22 towards the housing 24 at the time of bolting those members together.

Figure 3:
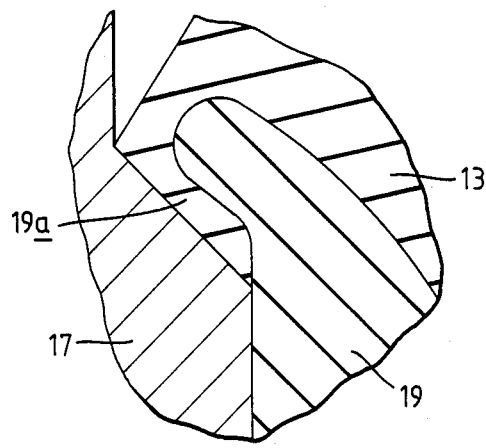
FIG. 3 is a detailed view of part of FIG. 1 showing location of part of the elastomeric bearing.

FIG. 3 shows the manner in which elastomeric material of the bearing is clamped to the inner rigid member by the inner ring during assembly. The inner ring serves to clamp the elastomeric material at regions 19a and 19b and the outer ring provides clamping at regions 27a and 27b.

The annular diaphragm 14 is of a generally flat form and is formed of textile reinforced nitrile rubber. A radially inner region 28 of the diaphragm is clamped by means of bolts and a metal ring 29 to a surface of the inner member support portion 17 lying between the annular recess 18 and the part-spherical surface 20. A radially outer region of the diaphragm is clamped to the housing 24 by means of a retainer ring 30 situated in an annular housing recess and caused to clamp the diaphragm against an end of the recess by virtue of axial load applied by the flange portion 22. The diaphragm is positioned to lie in a pane which is perpendicular to the longitudinal axis of the joint means and which contains the pivot point P. The sealed chamber 15 therefore is defined by surfaces of the elastomeric bearing 13, the housing 24, the bearing support portion 17 of the inner rigid member and the diaphragm. Chamber 15 is filled with silicon oil.

The design of the diaphragm 14 is such that it can readily accommodate the maximum relative rotation of the inner and outer rigid members 11,12 about the longitudinal axis of the joint under normal working conditions and as restricted by the torsional resistance of the elastomeric bearing 13.

The annular chamber 31 defined between the diaphragm and the flange portion 22 will tend to change in volume during flexing of the joint. To ensure that no undesirable pressure forces arise a small passage 32 is provided through the bearing support portion so as to ensure that the fluid pressure P2 in the chamber 31 equals that pressure, P1, in the through-passage 33. The fluid in the sealed chamber 15 will therefore also experience a pressure P3 equal to that in the through-passage because of the flexibility of the diaphragm 14. To avoid the diaphragm experiencing high stresses the fluid in the sealed chamber should be substantially incompressible. Pressure P4 is that of the operating environment.

Because the diaphragm is positioned in a transverse plane containing the pivot point P of the joint means it does not experience strains as great as those experienced by the elastomeric material of the elastomeric bearing 13. Therefore the choice of suitable materials for the diaphragm is not confined to those able to accommodate high extensions. Use may, for example, be made of relatively hard elastomers (e.g. those greater than 90 Shore A hardness) and many of which are well able to resist rapid degradation by fluids such as hydrogen sulphide to which the diaphragm may be exposed if the joint means is used in a conduit for the transportation of hot crude oil.

Figure 4:
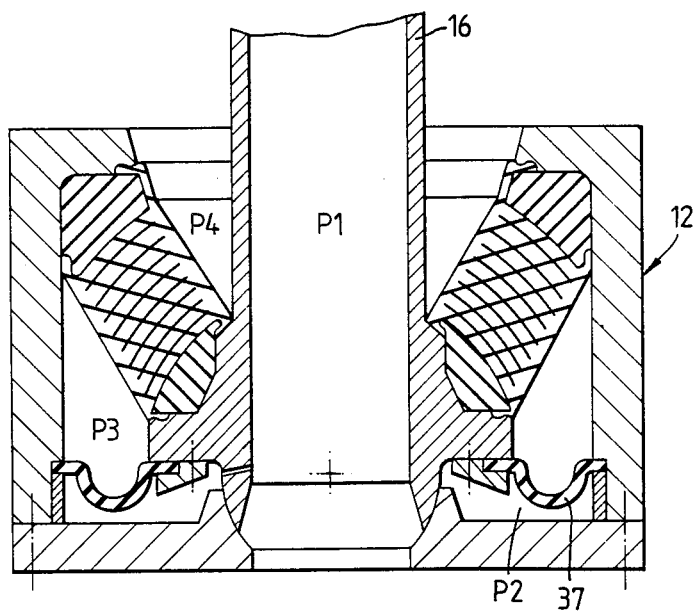
FIG. 4 is a view similar to that of FIG. 1 of another flexible joint means in accordance with the present invention.
Figure 5:
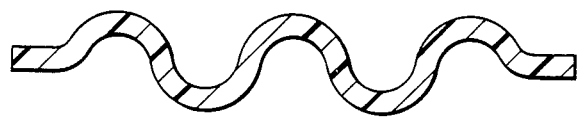
FIGS. 5 to 9 show sectional views of alternative types of flexible diaphragm for use in the joint means of FIG. 1.
Figure 6:
Figure 7:
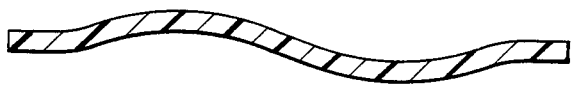
Figure 8:
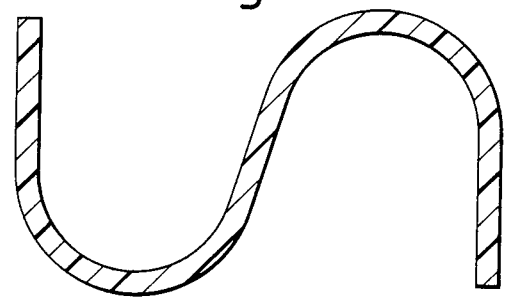
Figure 9:
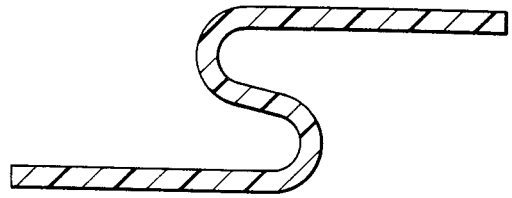

It is not however essential that the diaphragm be flat. It may be of a U-section form such as that of the diaphragm 37 shown in FIG. 4. Alternatively it may be of a corrugated section as shown in FIG. 5 (note FIGS. 5 to 9 show the cross-section of only one half of a diaphragm), a dished form as shown in FIG. 6 or an undulating form as shown in FIG. 7. Additional alternatives particularly applicable to diaphragms formed of polymeric material include rolling lobe type configurations as shown in FIGS. 8 and 9.

Particularly where the elastomeric bearing 13 is able to permit a significant relative rotation of the inner and outer rigid members 11,12, say a relative rotation of more than ±3°, a face seal assembly may be provided between the diaphragm 14 and one of the rigid members, preferably the outer rigid member, to permit relative sliding movement but prevent leakage of fluid therebetween.

Figure 10:
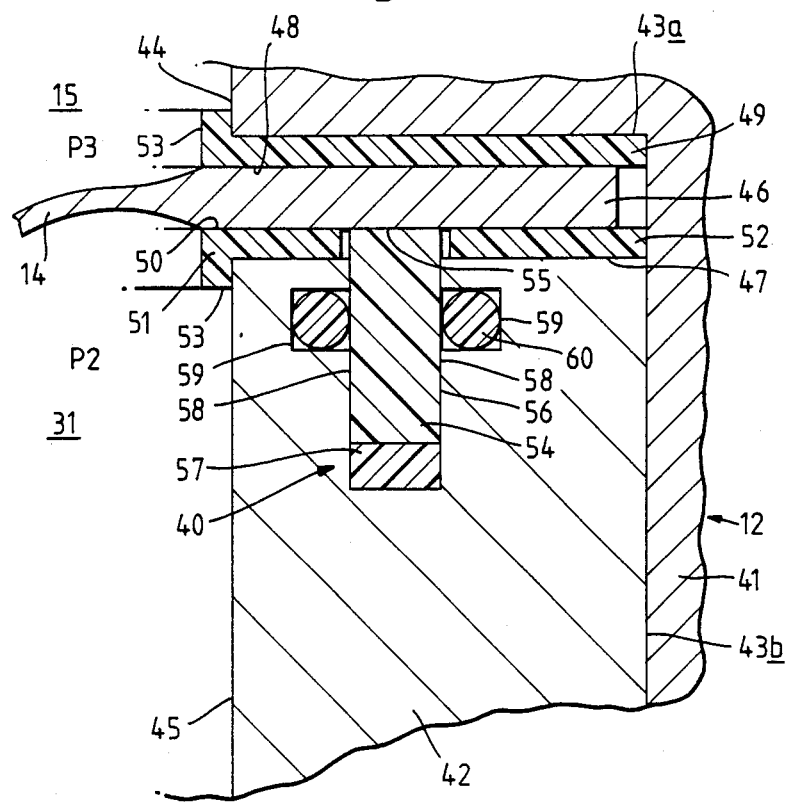
FIG. 10 is a cross-sectional view of a modified portion of the joint assembly of FIGS. 1 to 3.

FIG. 10 shows part of the flexible joint of FIG. 1 modified to incorporate a face seal assembly 40 between the diaphragm 14 and outer rigid member 12.

The outer rigid member 12 comprises a first, outer annular housing member 41 and a second, inner annular housing member 42 located in an internal annular recess formed by radial and axial surfaces 43a, 43b of the outer housing. The radially innermost surfaces 44,45 of the two housing members are of equal diameter.

The innermost surfaces define in part the abovedescribed fluid chambers 15,31 which are sealed from one another by a flexible diaphragm 14, in this case a steel diaphragm, the flexibility of the diaphragm generally permitting equalization of the pressures P3 and P2 in the two chambers 15,31 without fluid flow therebetween.

The peripheral region 46 of the diaphragm 14 extends radially outwards of the housing inner surfaces 44,45 and lies between the radial outer housing surfaces 43a and a confronting transverse radial surface 47 of the inner housing 42.

An upper surface 48 of the diaphragm peripheral region 46 is rotatably supported relative to the surface 43a of the outer housing 41 by an upper support ring 49 of polytetrafluoroethylene (PTFE). A lower surface 50 of said region 46 is rotatably supported relative to the inner housing 42 by an inner lower support ring 51 and an outer lower support ring 52. Radially inner edges of the upper support ring 49 and inner lower support ring 51 are each provided with an integral flange 53 which bears against a respective innermost surface 44,45 of a housing member.

The PTFE support rings are provided in a floating type arranged whereby upon rotational movement of the diaphragm 14 relative to the housing members 41,42 each said support ring may slide relative one or each of the confronted surfaces (43a and 48 or 47 and 50) of the diaphragm and a housing member.

The support rings 49,51 serve in use of the sealed assembly to carry loads imposed on the housing members as a result of relative axial and conical deflections between the housing members 41,42 of the outer rigid member 12 and the inner rigid member 11 (not shown in FIG. 10) to which a central portion of the diaphragm is secured.

The radially outermost surface of the inner lower support ring and the radially innermost surface of the outer lower support ring are spaced to allow a face seal assembly 40 to extend therebetween from the inner housing member 42 and into sealing contact with the relative rotatable diaphragm lower surface 50.

The face seal assembly 40 comprises an annular PTFE face seal 54 of rectangular cross-sectional shape and having a first face 55 which serves as a sealing face for siding and sealing contact with the diaphragm lower surface 50. The face seal is supported relative to the inner housing 42 by an annular groove 56 formed in the end face 47 of the housing and of a width, as considered in the radial direction of the assembly, slightly greater than the radial thickness of the face seal.

The face seal assembly comprises also an actuating ring 57 formed of a resiliently deformable fluoroelastomeric material and disposed between the face seal 54 and base of the groove 56. The seal 54 is restrained against rotation relative to the inner housing by virtue of the coefficients of friction between the ring 57 and the face seal 54 and groove 56 being greater than that between the seal 54 and surface 50.

Figure 11A:
FIGS. 11a–11h show shows cross-sectional views of actuating rings for use in the assembly of FIG. 10.
Figure 11C:
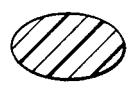
Figure 11E:
Figure 11G:
Figure 11B:
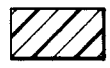
Figure 11D:
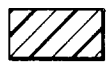
Figure 11F:
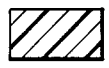
Figure 11H:
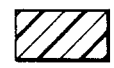

In the assembled condition of FIG. 10 the actuating ring 57 is deformed to a rectangular cross-sectional shape which wholly occupies the space between the face seal 54 and base of the groove 56. Prior to said deformation the ring is of a circular cross-sectional shape as shown in FIG. 11a, though other cross-sectional shapes such as the ellipse of FIG. 11c, the rectangle of FIG. 11e or the trapezoidal shape of FIG. 11g may be employed. In general a circular shape as shown in FIG. 11a will allow a higher axial deflection on compression than the rectangular shape of FIG. 11e for rings of similar materials. FIGS. 11b, 11d, 11f and 11h show the rings of FIGS. 11a, 11c, 11e and 11g respectively in a deformed condition.

Each sidewall 58 of the groove 56 is formed with an auxiliary groove 59 which in the assembled condition of the sealed assembly lies alongside the face seal 54. An 'O' ring seal 60 is located in each auxiliary groove to isolate the actuating ring 57 from the pressurized fluid in the respective chambers 15,31. The 'O' ring seals 60 typically are each formed from the same fluorelastomeric material as the actuating ring 57.

Figure 12:
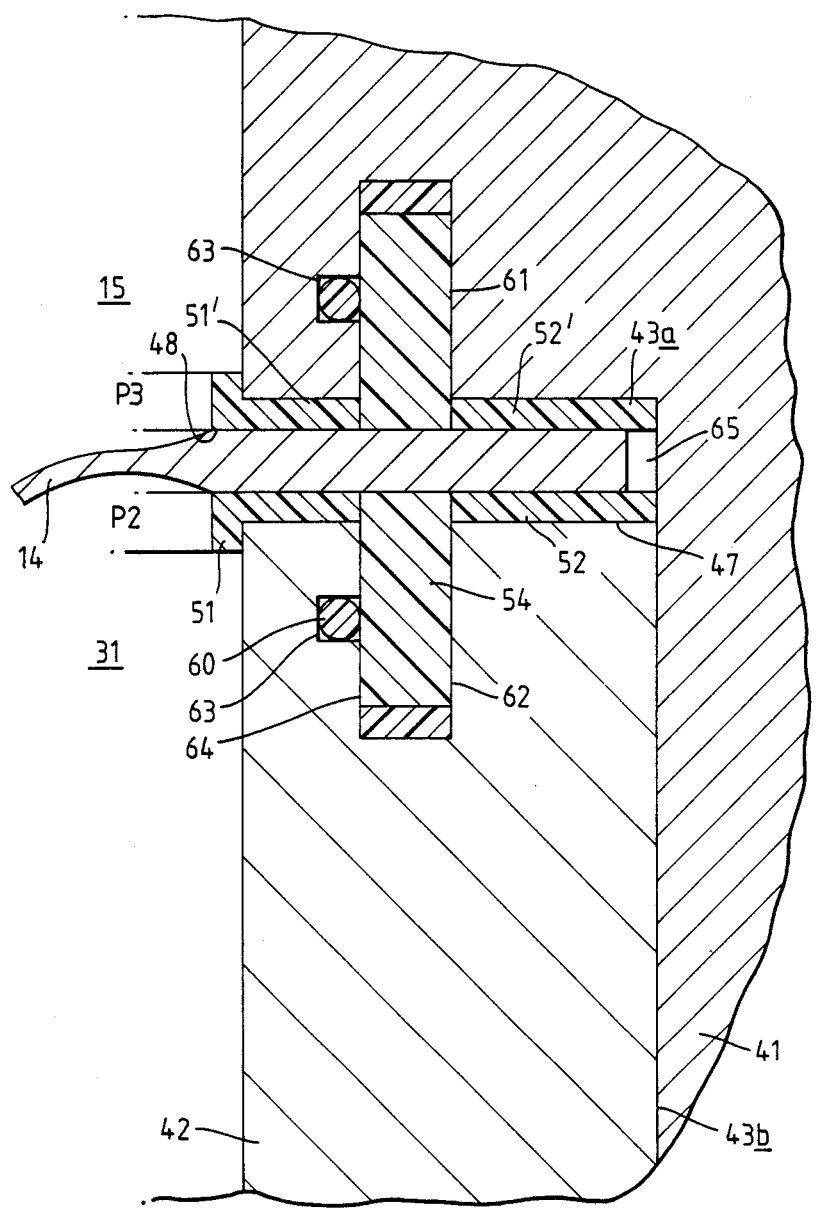
FIG. 12 is a cross-sectional view of an alternative modified portion of the joint assembly of FIGS. 1 to 3.

In another embodiment of the present invention, illustrated in FIG. 12, a joint assembly comprises outer and inner housing members 41,42 and a steel diaphragm 14 as described in respect of the preceding embodiment with reference to FIG. 10. Like reference numerals are used for corresponding components.

The construction differs in that the confronting surfaces 43a,48 have disposed therebetween inner and outer PTFE upper support rings 51,52 which correspond with the aforedescribed inner and outer lower support rings 51,52 in place of the single upper support ring 49.

A second groove 61 is provided in the radial recess 43a at a radial position aligned with the groove 62 provided in the end face 47. The two grooves are similar and each differ from the aforedescribed groove 56 in that they each have only one auxiliary groove 63. Each auxiliary groove is provided in that groove sidewall 64 nearest a respective fluid chamber 15,31. Each groove 61,62 and auxiliary groove 63 contains a face seal 54 and auxiliary groove 'O' ring seal 59 as aforedescribed.

The axial surface 43b of the outer housing has a radius greater than that of the diaphragm 14 and thus a peripheral chamber 65 is formed around the diaphragm.

The face seals 54 and 'O' ring seals 59 serve in the second embodiment to isolate that chamber 65 from the fluid chambers 15,31. The chamber may be vented to atmosphere and/or connected to a leak detector to assist in maintaining the actuating rings isolated from the pressure of fluid in the chambers 15,31.

The inner housings 42 of the joint assemblies of FIGS. 10 and 12 will serve as a retainer ring 30 of the assembly described with reference to FIGS. 1 to 3 and which may be moved axially relative to the outer housing 41 to compress an actuating ring 57 on assembly.

I claim:

1. A flexible joint means having a through-bore for the flow of fluid, said joint means comprising a pair of annular rigid members relatively rotatable about the longitudinal axis of the flexible joint means, annular elastomeric bearing means interposed between said relatively rotatable annular rigid members to flexibly interconnect said members and transmit load therebetween, and a normally sealed chamber positioned between said relatively rotatable annular rigid members and between said bearing means and the bore of the joint means whereby an otherwise exposed surface of the bearing means is protected from contact by fluid flowing through the bore of the joint means during use thereof, said sealed chamber containing a substantially incompressible fluid and being defined at least in part by a diaphragm which extends between the annular rigid members, an annular chamber surrounding said bore and positioned on the opposite side of said diaphragm, said annular chamber being fluid filled and subjected to the same fluid pressure as the fluid in the bore of the joint means, and said diaphragm being flexible whereby it is able to accommodate relative rotation of the annular rigid members and maintain a balance between the pressure of said incompressible fluid and the pressure of fluid within said annular chamber.

2. A flexible joint means according to claim 1 and which during flexing pivots about a pivot point of substantially fixed location.

3. A flexible joint means according to claim 2 wherein the joint means incorporates a spherical type bearing comprising a pair of substantially complementary shaped part-spherical bearing surfaces.

4. A flexible joint means according to claim 2 wherein the flexible diaphragm is positioned in close proximity to said pivot point.

5. A flexible joint means according to claim 1 wherein the annular chamber is defined at least in part by a flexible diaphragm arranged to be rotatable relative to one of said annular rigid members.

6. A flexible joint means according to claim 5 wherein a seal assembly is provided between the diaphragm and said one of the rigid members to prevent leakage of fluid therebetween.

7. A flexible joint means according to claim 5 wherein a radially inner or outer peripheral portion of the diaphragm is slidingly and sealingly located in an annular groove associated with a respective one of the rigid members.

8. A flexible joint means according to claim 1 wherein means is provided for equalization of substantial equalization of the pressure in the annular chamber with that in the through-bore.

* * * * *